United States Patent
Shepherd et al.

(10) Patent No.: US 9,323,879 B2
(45) Date of Patent: *Apr. 26, 2016

(54) METHOD OF OPTIMIZING THE DESIGN OF AN ELECTRONIC DEVICE WITH RESPECT TO ELECTROMAGNETIC EMISSIONS BASED ON FREQUENCY SPREADING INTRODUCED BY HARDWARE, COMPUTER PROGRAM PRODUCT FOR CARRYING OUT THE METHOD AND ASSOCIATED ARTICLE OF MANUFACTURE

(71) Applicants: John Avis Shepherd, Blagnac (FR); Kamel Abouda, Saint Lys (FR); Bertrand Vrignon, Plaisance du Touch (FR)

(72) Inventors: John Avis Shepherd, Blagnac (FR); Kamel Abouda, Saint Lys (FR); Bertrand Vrignon, Plaisance du Touch (FR)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/324,404

(22) Filed: Jul. 7, 2014

(65) Prior Publication Data

US 2015/0227665 A1 Aug. 13, 2015

(30) Foreign Application Priority Data

Feb. 7, 2014 (WO) .................. PCT/IB2014/000371

(51) Int. Cl.
*G06F 17/50* (2006.01)
*G01R 31/00* (2006.01)

(52) U.S. Cl.
CPC .......... *G06F 17/5068* (2013.01); *G01R 31/002* (2013.01)

(58) Field of Classification Search
CPC .................................................... G06F 2217/82
USPC .......................... 716/100, 106, 115, 132, 136
See application file for complete search history.

(56) References Cited

U.S. PATENT DOCUMENTS

| | | | |
|---|---|---|---|
| 3,668,294 A | | 6/1972 | Kameoka et al. |
| 3,675,124 A | * | 7/1972 | Ashley et al. .................. 324/613 |
| 4,446,446 A | * | 5/1984 | Fowks ................. 331/3 |
| 4,539,530 A | | 9/1985 | Mizumura et al. |
| 4,771,465 A | | 9/1988 | Bronson et al. |
| 6,172,579 B1 | * | 1/2001 | Dacus et al. .................. 332/128 |

(Continued)

FOREIGN PATENT DOCUMENTS

WO 2012143749 A1 10/2012

OTHER PUBLICATIONS

Lin, Chin-Yu et al., "An Offset Phase-Locked Looop Spread Spectrum Clock Generator for SATA III," IEEE 2010 Custom Integrated Circuits Conference; IEEE, Piscataway, NJ; ISBN: 978-1-4244-5760-1; Sep. 19, 2010; 4 pages.

(Continued)

*Primary Examiner* — Paul Dinh

(57) ABSTRACT

There is described a method of optimizing the design of an electronic device with respect to electromagnetic emissions based on frequency spreading. With the method, a designer can add frequency spreading with specific parameters by hardware. The resulting frequency spread signal can be observed. The designer can thus evaluate the reduction in electromagnetic emission level, and repeat this process by iteratively applying frequency spreading each time with specific parameters but without having to modify the design of the device and to generate another prototype of the device.

17 Claims, 5 Drawing Sheets

(56) References Cited

U.S. PATENT DOCUMENTS

| | | | |
|---|---|---|---|
| 6,278,870 B1* | 8/2001 | Davie et al. | 455/302 |
| 6,842,727 B1* | 1/2005 | Hayashi | 703/18 |
| 7,039,572 B1 | 5/2006 | Narahara et al. | |
| 7,222,033 B1* | 5/2007 | Newson et al. | 702/65 |
| 2002/0045995 A1* | 4/2002 | Shimazaki et al. | 702/77 |
| 2005/0289497 A1* | 12/2005 | Matsumoto | 716/15 |
| 2006/0003717 A1* | 1/2006 | Sowlati | 455/168.1 |
| 2006/0040634 A1* | 2/2006 | Wang | 455/313 |
| 2006/0132118 A1* | 6/2006 | Maekawa et al. | 324/96 |
| 2006/0173662 A1* | 8/2006 | Kazama et al. | 703/4 |
| 2006/0252396 A1* | 11/2006 | Barak et al. | 455/259 |
| 2007/0086274 A1* | 4/2007 | Nishimura et al. | 367/140 |
| 2007/0087720 A1* | 4/2007 | Pullela et al. | 455/323 |
| 2008/0123777 A1* | 5/2008 | Trager et al. | 375/316 |
| 2008/0157900 A1* | 7/2008 | El Rai et al. | 333/139 |
| 2009/0147963 A1 | 6/2009 | Smith | |
| 2010/0148827 A1* | 6/2010 | Olgaard | 327/100 |
| 2011/0306313 A1* | 12/2011 | Jaisimha et al. | 455/185.1 |
| 2012/0313697 A1 | 12/2012 | Hafizovic et al. | |
| 2014/0067273 A1* | 3/2014 | Puryear et al. | 702/14 |
| 2014/0149088 A1 | 5/2014 | Kirsanov et al. | |

OTHER PUBLICATIONS

Mori, Ibuki et al., "EMI Reduction by Spread-Spectrum Clocking in Digitall-Controlled DC-DC Converters," IEICE Transactions on Fundamentals of Electronics, Communications and Computer Sciences; Engineering Sciences Society, Tokyo, JP; vo. E92-A, No. 4; Apr. 1, 2009; pp. 1004-1011.

Crisafulli, V. et al, "Model Based Design Tool for EMC Reduction Using Spread Spectrum Techniques in Induction Heating Platform", 13th International Conference on Optimization of Electrical and Electronic Equipment (OPTIM), May 24-26, 2012, IEEE Conference Publications, 2012, pp. 845-852.

Hormaier, K. et al, "An EMI Receiver Model to Evaluate Electromagnetic Emissions by Simulation," 2012 IEEE International Instrumentation and Measurement Technology Conference (I2MTC), May 13-16, 2012; pp. 2558-2562.

International Electrotechnical Commission, "CISPR 16-1-1 Specification for radio disturbance and immunity measuring apparatus and methods; Part 1-1: Radio disturbance and immunity measuring apparatus—Measuring apparatus"; First edition, Nov. 2003; Reference No. CISPR 16-1-1-2003; 138 pages.

Shepherd, J. et al, "Getting the Most Out of Frequency Spreading," Freescale Semiconductor, Inc., Toulouse, France; EMC Compo; 2009; 6 pages.

U.S Appl. No. 14/324,391, filed Jul. 7, 2014, entitled "Method of Optimizing the Design of an Electronic Device With Respect to Electromagnetic Emissions Based on Frequency Spreading Introduced by Data Post-Processing, Computer Program Product for Carrying Out the Method and Associated Article of Manufacture".

U.S Appl. No. 14/324,392, filed Jul. 7, 2014, entitled "Method of Optimizing the Design of an Electronic Device With Respect to Electromagnetic Emissions Based on Frequency Spreading Introduced by Software, Computer Program Product for Carrying Out the Method and Associated Article of Manufacture".

Non-Final Office Action mailed May 12, 2015 for U.S. Appl. No. 14/324,391, 19 pages.

Non-Final Office Action mailed May 12, 2015 for U.S. Appl. No. 14/324,392, 18 pages.

Final Office Action mailed Sep. 3, 2015 for U.S. Appl. No. 14/324,391, 4 pages.

Final Office Action mailed Sep. 3, 2015 for U.S. Appl. No. 14/324,392, 4 pages.

Notice of Allowance mailed Dec. 16, 2015 for U.S. Appl. No. 14,324,391, 5 pages.

Notice of Allowance mailed Feb. 4, 2016 for U.S. Appl. No. 14,324,392, 7 pages.

\* cited by examiner

METHOD OF OPTIMIZING THE DESIGN OF AN ELECTRONIC DEVICE WITH RESPECT TO ELECTROMAGNETIC EMISSIONS BASED ON FREQUENCY SPREADING INTRODUCED BY HARDWARE, COMPUTER PROGRAM PRODUCT FOR CARRYING OUT THE METHOD AND ASSOCIATED ARTICLE OF MANUFACTURE

CROSS REFERENCE TO RELATED APPLICATIONS

The present application claims priority to International Application No. PCT/IB2014/000371, entitled "METHOD OF OPTIMIZING THE DESIGN OF AN ELECTRONIC DEVICE WITH RESPECT TO ELECTROMAGNETIC EMISSIONS BASED ON FREQUENCY SPREADING INTRODUCED BY SOFTWARE, COMPUTER PROGRAM PRODUCT FOR CARRYING OUT THE METHOD AND ASSOCIATED ARTICLE OF MANUFACTURE," filed on Feb. 7, 2014, the entirety of which is herein incorporated by reference.

The present application is related to co-pending U.S. patent application Ser. No. 14/324,391, entitled "METHOD OF OPTIMIZING THE DESIGN OF AN ELECTRONIC DEVICE WITH RESPECT TO ELECTROMAGNETIC EMISSIONS BASED ON FREQUENCY SPREADING INTRODUCED BY DATA POST-PROCESSING, COMPUTER PROGRAM PRODUCT FOR CARRYING OUT THE METHOD AND ASSOCIATED ARTICLE OF MANUFACTURE," filed on Jul. 7, 2014, and U.S. patent application Ser. No. 14/324,392, entitled "METHOD OF OPTIMIZING THE DESIGN OF AN ELECTRONIC DEVICE WITH RESPECT TO ELECTROMAGNETIC EMISSIONS BASED ON FREQUENCY SPREADING INTRODUCED BY HARDWARE, COMPUTER PROGRAM PRODUCT FOR CARRYING OUT THE METHOD AND ASSOCIATED ARTICLE OF MANUFACTURE," filed on Jul. 7, 2014, the entirety of which are herein incorporated by reference.

FIELD OF THE INVENTION

This invention relates to method of optimizing the design of an electronic device with respect to electromagnetic emissions based on frequency spreading introduced by hardware, to a computer program product for carrying out the method and to an associated article of manufacture.

BACKGROUND OF THE INVENTION

Electromagnetic compatibility (EMC) is a fundamental constraint that all electric or electronic equipments must meet to ensure the simultaneous operation of electric or electronic devices present at the same time in a given area, for a given electromagnetic environment.

By definition, EMC covers two complementary aspects: the electromagnetic (EM) emission and the immunity to electromagnetic interferences. When designing new electric or electronic devices, it is desirable to both keep the emission low and ensure robustness of the device, such that it complies with certain limits. Mainly, such EMC limits are defined by standards, e.g. CISPR 25, "Radio disturbance characteristics for the protection of receivers used on board vehicles, boats, and on devices—Limits and methods of measurement", IEC, 2002. Sometimes, more drastic limits may be defined by the customers. Moreover, the measurement equipment is described in CISPR 16-1-1 Specification for radio disturbance and immunity measuring apparatus and methods—Part 1-1: Radio disturbance and immunity measuring apparatus—Measuring apparatus.

When the maximum level of EM emissions at a given frequency specified by a standard or by customers is exceeded, the performance can be improved by spreading the signal at a specific frequency over a band of frequencies. Indeed, frequency spreading is often used to reduce the susceptibility of a receiver to an aggressor or to reduce the effect of a transmission on a victim.

The measurement of electromagnetic emissions by hardware can only be carried out on a real device, e.g. a prototype, and not during the design phase. The difficulty is to determine the optimum parameters for the frequency spreading, which may include the form of the modulating signal (ramp, triangle, stepped or linear, etc), the frequency of the modulating signal and the peak frequency deviation, without having to spend time simulating "real schematics" or, worse, having to generate numerous versions of the device to test different configurations.

Key principles of frequency spreading applied to EM emission reduction, as well as more general considerations regarding frequency spreading are disclosed in the publication by J. Shepherd, et al, "Getting the most out of frequency spreading", EMC Compo 2009.

However, the addition of the frequency spreading function into the existing schematic of the device under test (DUT) may be difficult to achieve, particularly when various combinations of frequency spreading parameters must be tried.

SUMMARY OF THE INVENTION

The present invention provides a method, an equipment and an apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1A:
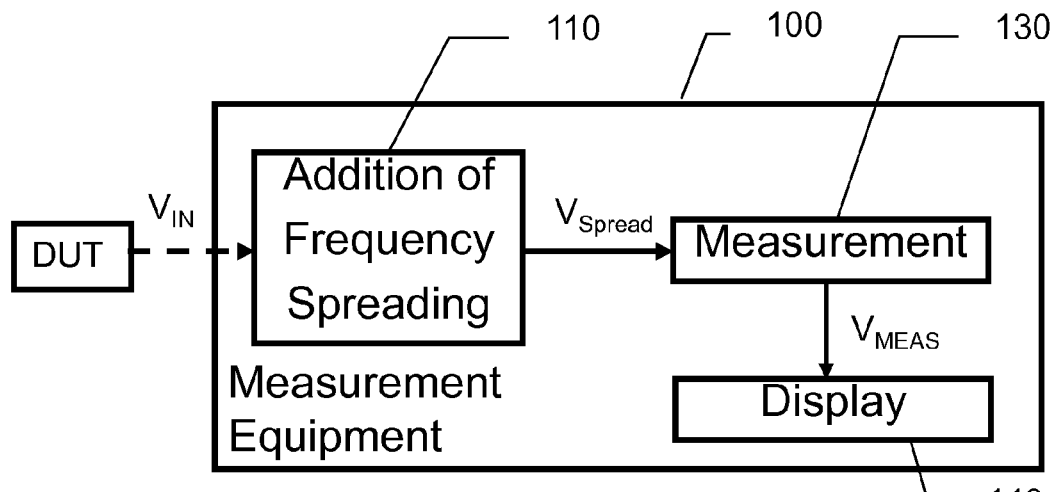
FIG. 1A is a schematic block diagram of a setup according to embodiments of the invention wherein frequency spreading is added to a signal being measured inside a measurement equipment.

A method of debugging electromagnetic emission problems during the design phase of an electronic device is presented. It allows optimizing the design of an electronic device with respect to electromagnetic emissions. The device under test (DUT) may be an integrated circuit (IC), or a complete system comprising an arrangement of various ICs, printed circuit boards (PCBs), peripherals, interfaced devices, etc.

The method may be implemented; for instance, during device prototyping, testing and qualification, namely before mass production of the product is launched.

However, the device considered here is an 'actual', i.e. a real device. Namely, it not a device described by modelling rules at either behavioural level or even circuit level. It is definitely a physical entity produced, for example, in the late steps of the design phase. For instance, it can be a prototype of the final product, dedicated to the performance of various tests including, though not being limited to EMC characterization. Such a prototype can be an engineering sample ready for test and qualification. Alternately, it can belong to a pre-series engineering lot manufactured before scale production, for instance.

It will be appreciated, however, that the method can also be applied to a device in production, for example if a customer is unable to pass EMC tests.

Embodiments of the invention rely on applying frequency spreading to a signal being measured which originates from the DUT, without the need to modify the device or part of the device generating the signal. Frequency spreading is applied in a circuitry adapted to mix the signal being measured with a frequency spread signal having controllable frequency spreading parameters. Thus, the device does not need to be modified to test the reduction in electromagnetic emissions achieved by frequency spreading. Hence, many different configurations of frequency spreading parameters can be tested rapidly. If necessary, a single redesign of the device needs to be performed when optimum frequency spreading parameters have been determined. Such redesign is aimed at adding, in the device itself, the circuitry adapted to introduce frequency spreading according to the determined parameters.

Embodiments of the invention can be implemented in any measurement equipment, for instance an EMI test receiver or a spectrum analyser. Existing equipments just need to be adapted, if necessary, in order to provide controllable means of adding frequency spreading to a signal being measured according to varying frequency spreading parameters under the control of a user.

In other embodiments, the frequency spread signal can be generated and applied in a separate, namely external equipment adapted to be placed between the device being measured and the measurement equipment. Thus, the method of optimizing the design of an electronic device with respect to electromagnetic emissions can be implemented with existing measurement equipment as they stand.

Because the illustrated embodiments of the present invention may for the most part, be implemented using hardware and/or software components known to those skilled in the art, details will not be explained in any greater extent than that considered necessary, for the understanding and appreciation of the underlying concepts of the present invention and in order not to obfuscate or distract from the teachings of the present invention.

With reference to FIG. 1A, the method of applying frequency spreading at hardware level may be applied by a setup consisting of an electromagnetic measurement equipment 100 adapted to measure a signal $V_{IN}$ emitted by, e.g. a pin or a terminal of the electronic device under test (not shown). Equipment 100 may be an EMI test receiver, a spectrum analyser or an oscilloscope, for instance. The addition of frequency spreading to the input signal $V_{IN}$ may be performed by e.g. an internal circuitry 110, adapted to mix the input signal $V_{IN}$ with a frequency spread signal having determined frequency spreading parameters, before actual measurement is performed. The frequency spreading signal $V_{Spread}$ thus obtained is passed to standard measurement tools 130 of the equipment 100, to generate the measured signal $V_{MEAS}$. This measured signal $V_{MEAS}$ is then processed and displayed on a display 140 of the measurement equipment 100 for allowing the user to check compliance with the relevant EMC requirements which must be met by the device, and which may depend on the specific application. Such EMC test may consist in checking whether measured electromagnetic levels keep below given thresholds. If yes, then the test is passed. If not, then the frequency spreading parameters have to be modified in order to reduce the unwanted electromagnetic emissions.

Figure 1B:
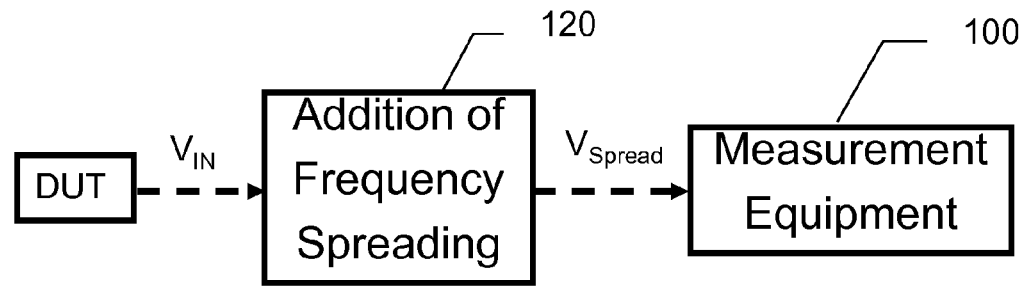
FIG. 1B is a schematic block diagram of a setup according to embodiments of the invention when frequency spreading is added to the signal being measured in a hardware device external to the measurement equipment.

In other embodiments as shown in FIG. 1B, the signal $V_{IN}$ being measured is mixed with a frequency spread signal in an separate equipment 120, that is to say in an entity which is separate from the measurement equipment 100. In such embodiments, namely, there is provided an apparatus 120 adapted to be inserted between the device under test (DUT) and the measurement equipment 100, to receive the signal $V_{IN}$ to be measured and add thereto a frequency spread signal, and finally to output a frequency spread version $V_{Spread}$ of the signal $V_{IN}$ to be measured. This frequency spread signal $V_{Spread}$ is measured by the measurement equipment 100. To that end, the measurement equipment 100 comprises conventional means such as the measurement tools 130 and display 140 described above with reference to FIG. 1A.

In both cases as illustrated by FIG. 1A and FIG. 1B, namely irrespective of whether the means for introducing frequency spreading in the signal $V_{IN}$ to be measured are within measurement equipment 100 or are external thereto, what is achieved is the addition of frequency spreading to the said signal $V_{IN}$ before actual measurement by the measurement equipment 100. The resulting measured signal can be filtered using well known filtering techniques and the resulting spectrum can be displayed to the user.

To that end, measurement apparatus 100 may comprise a Graphical User Interface (GUI) which provides Input/Output functionality using, for example, editing and controlling icons and menus, viewing screens, plot printers, etc. In particular, the level of EM emissions may be displayed to the user through GUI. This allows the user to check whether the measured signal causes spurious emissions leading to failure to meet the EMC specifications, and to evaluate the improvement that could be obtained by modifying the device to add means applying frequency spreading according to the set of frequency spreading parameters being tested. These parameters include, for instance, the form of the modulating signal (ramp, triangle, stepped or linear, etc), the frequency of the modulating signal and the peak frequency deviation.

At least some of these frequency spreading parameters are varied and the measurement is repeated until optimum parameters are reached. Advantageously, the device under test generating the signal $V_{IN}$ does not need to be modified when testing the reduction of electromagnetic emissions achieved each new set of frequency spreading parameters. Stated otherwise, reduction in the electromagnetic emissions of an electronic device using frequency spreading can be optimized without the need to modify the device for performing such optimisation. In still other words, embodiments of the invention offer the possibility of trying various frequency spreading parameters by applying frequency spreading to the signal generated by the device under test, without modifying the device or part of the device generating the signal for each try.

Figure 2:
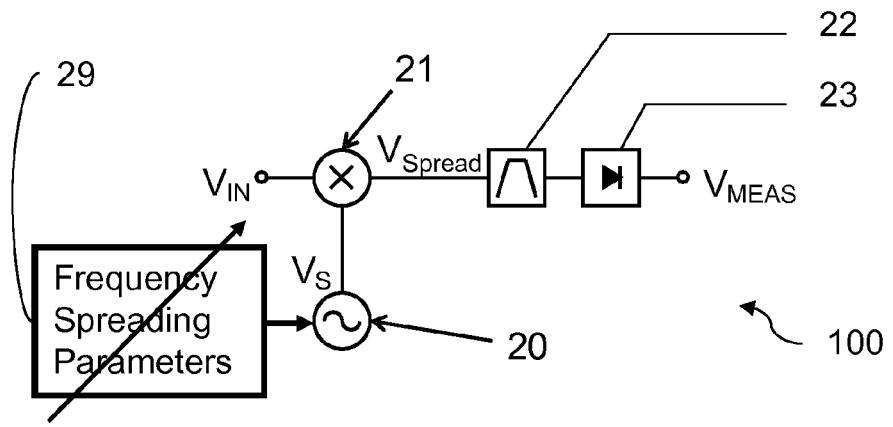
FIG. 2 is a block diagram of a first example of hardware setup for introducing frequency spreading to the signal according to embodiments of FIG. 1A.

With reference to FIG. 2, there will now be described a first embodiment of a hardware setup adapted to introduce frequency spreading to the signal to be measured according to embodiments of FIG. 1A, that is to say with means for adding frequency spreading to the signal $V_{IN}$ which are part of the measurement equipment 100.

In this embodiment the signal $V_{IN}$ to be frequency spread is mixed with a frequency spread signal $V_S$ output by a local oscillator 20 of the equipment 100. This signal $V_S$ is frequency-spread according to a set of determined frequency spreading parameters.

In the shown example, the signal $V_{IN}$ is multiplied by the signal $V_S$. In this example, indeed, the frequency spreading hardware setup of the measurement equipment is based on the well-known super-heterodyne conversion stage. It may thus comprise an input for receiving the signal $V_{IN}$ to be frequency spread, which is coupled to a first input of a frequency mixer 21, for instance an analog multiplier or a digital multiplier if the signal $V_{IN}$ is first analog-to-digital converted. The frequency spreading signal $V_S$ may be provided by a frequency spread source 20, which may be a local oscillator of the equipment 100, whose output is coupled to a second input of the multiplier 21. For instance the source 20 may be a variable frequency oscillator providing an analog signal, or digital output values, adapted to be multiplied by multiplier 21 with the signal $V_{IN}$ or with the digital version thereof, respectively. In a variant, the source 20 may be a memory table storing time-voltage pairs (piece-wise linear). The signal $V_S$ is frequency spread according to the above mentioned determined frequency spreading parameters.

The resulting, i.e. mixed signal $V_{Spread}$ output by the multiplier 21 is filtered by a band pass filter 22 to remove all but the desired intermediate frequency (IF) signal. The signal outputted by filter 22 is finally fed to a detector 23 which is adapted to amplify and detect the desired signal, and to output the detected signal $V_{MEAS}$ of interest. Signal $V_{MEAS}$ is adapted to be observed by the user to check whether the EMC specifications are met or not. More precisely, the equipment 100 is further adapted to display the spectrum of the measured signal $V_{MEAS}$ on the display 140, thus allowing the user to check whether the EMC test is passed or not.

For mathematical convenience and simplicity of the present description, let us consider that both the existing signal $V_{IN}$ (as defined by data 130) and the frequency spreading signal $V_S$ are sine waves. For instance, $V_{IN}$ and $V_S$ may be given by:

$$V_{IN} = E_{IN} \times \cos(\omega t + \phi) \quad (1)$$

and, $$V_S = 2 \times \cos(\omega_S t) \quad (2)$$

so that the mixed signal $V_{MIX}$ is given by $$V_{MIX} = V_{IN} \times V_S = E_{IN} \times \cos[(\omega + \omega_S)t + \phi] + E_{IN} \times \cos[(\omega - \omega_S)t + \phi] \quad (3)$$

These resulting frequency products at the output of the multiplier 21 contain the sum and difference of the two multiplied signals and they are frequency spread with exactly the same parameters as the frequency spread signal $V_S$ provided by source 20. Band pass filtering of the product by filter 22 allows one or the other component to be selected before detection.

The detailed implementation may vary depending on the architecture of the measurement equipment 100. In practice, there may be several frequency conversions. Examples of implementation as regards the shape of the band pass filter and the detection method can be found in the specifications of the CISPR 16-1-1 standard.

With the embodiment as shown in FIG. 2 and discussed above, the sweeping of the desired frequency range can be achieved either by tuning the centre frequency of the band pass filter 22 or by shifting the centre frequency of the frequency spread source 20, or both.

Figure 3:
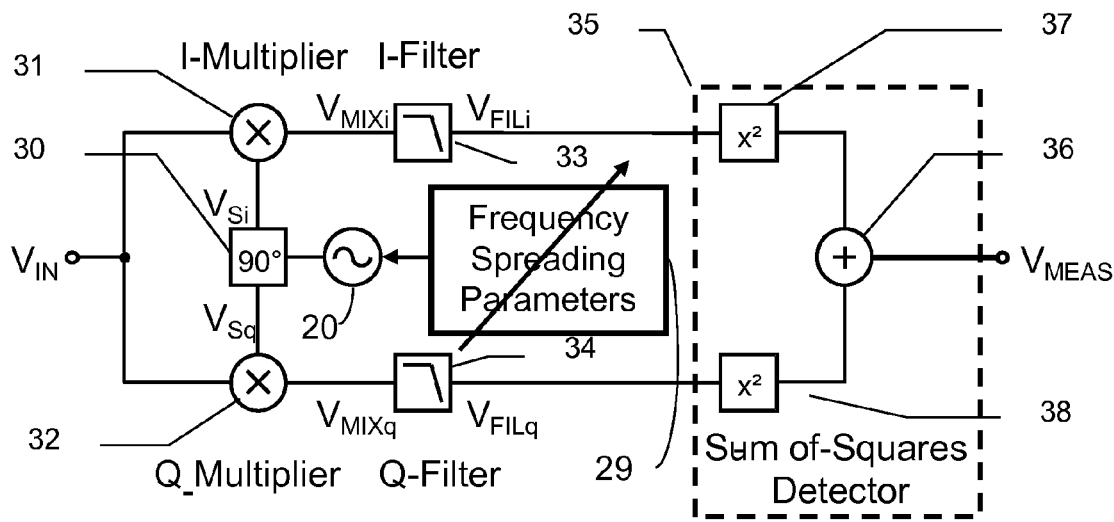
FIG. 3 is block diagram of a second example of hardware setup for introducing frequency spreading to the signal according to embodiments of FIG. 1A.

A second embodiment of a hardware setup 100 adapted to introduce frequency spreading to the signal to be measured according to embodiments of FIG. 1A is shown in FIG. 3. The shown embodiment is adapted to use direct quadrature conversion (IQ). This allows avoiding the detection of unwanted products, such as image frequencies, in the output signal $V_{MEAS}$.

The frequency multiplier 21 and the band-pass filter 22 of FIG. 2 are replaced, on one side, with an in-phase multiplier 31 also named an I-Multiplier and an in-phase filter 33 also named an I-Filter, and, on the other side, with an in-quadrature multiplier 32 also named a Q-Multiplier and an in-quadrature filter 34 also named a Q-Filter. In the implementation as shown, the 90° phase shift required to generate the quadrature signals $V_{Si}$ and $V_{Sq}$ fed to the I-Multiplier 31 and the Q-Multiplier 32, respectively, is placed in the frequency spread signal path. Indeed, a 90° phase shifter 30 may be placed between the frequency spread source 20 and the multipliers as shown. In a variant (not shown) the 90° phase shift may alternately be placed in the input signal path. Quadrature conversion ensures correct detection for all cases of phase. In all of these possible implementations, signals $V_{Si}$ and $S_{Sq}$ are 90° out of phase with each other.

The filtering of unwanted frequencies by filters 33 and 34 can be achieved with low-pass filtering structures as described, for instance, in the CISPR 16-1-1 standard.

Detection of the signal $V_{MEAS}$ from the signals $V_{FILi}$ and $V_{FILq}$ output by filters 33 and 34, respectively, may be achieved e.g. by the well-known Sum-of-Squares Detection (SSD) method. To this end, the detector 23 of FIG. 2 is replaced, in the embodiment as shown in FIG. 3, by a Sum-of-Squares detector 35. This detector 35 comprises square operators 37 and 38, following the I-Filter 33 and the Q-Filter 34, respectively. These operators 37 and 38 are adapted to raise the signals $V_{FILi}$ and $V_{FILq}$ output by I-Filter 33 and the Q-Filter 34, respectively, by the exponent of two. The raised signals are then summed by a digital adder 36, which provides the output signal $V_{MEAS}$ to be observed.

Assuming again that both the existing signal $V_{IN}$ and the frequency spreading signal $V_S$ are sine waves given above by relations (1) and (2), respectively, we have, for the in-phase path:

$$V_{Si}=2\times\cos(\omega_S t) \quad (4)$$

and, $$V_{MIXi}=V_{IN}\times V_{Si}=E_{IN}\times\cos[(\omega+\omega_S)t+\phi]+E_{IN}\times\cos[(\omega-\omega_S)t+\phi] \quad (5)$$

And for the in-quadrature path, we have:

$$V_{Sq}=2\times\sin(\omega_S t) \quad (6)$$

and, $$V_{MIXq}=V_{IN}\times V_{Sq}=E_{IN}\times\sin[(\omega+\omega_S)t+\phi]+E_{IN}\times\sin[(\omega-\omega_S)t+\phi] \quad (7)$$

After the filtering by filters 33 and 34, the filtered in-phase and in-quadrature signals $V_{FILi}$ and $V_{FILq}$, respectively, are given by:

$$V_{FILi}=E_{IN}\times\cos[(\omega-\omega_S)t+\phi] \quad (8)$$

and, $$V_{FILq}=E_{IN}\times\sin[(\omega-\omega_S)t+\phi] \quad (9)$$

whereby the output signal $V_{MEAS}$ is given by:

$$V_{MEAS}=V_{FILi}^2+V_{FILq}^2=E_{IN}^2 \quad (10)$$

These resulting frequency products at the output of the multipliers 31 and 32 contain the sum and difference of the two multiplied signals and they are frequency spread with exactly the same parameters as the frequency spread signal $V_S$ provided by source 20. Low pass filtering of the products by filters 33 and 34 allows the unwanted component to be suppressed before detection.

Figure 4:
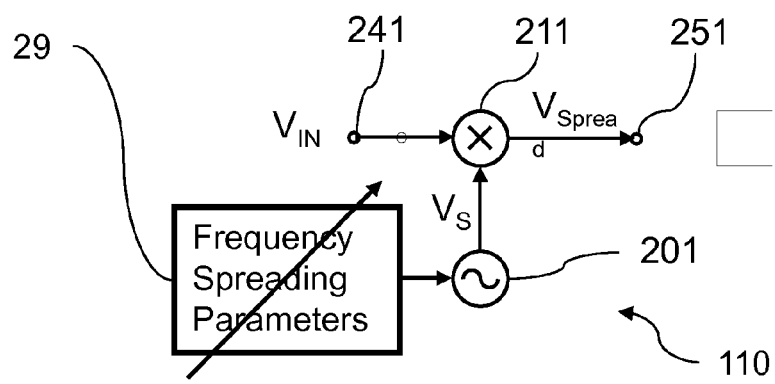
FIG. 4 is block diagram of a hardware setup for introducing frequency spreading to the signal according to embodiments of FIG. 1B.

FIG. 4 diagrammatically shows an embodiment of a hardware unit 110 adapted to introduce frequency spreading to the signal to be measured according to embodiments of FIG. 1B, that is to say with means for adding frequency spreading to the signal $V_{IN}$ which are external to the measurement equipment 100.

In this embodiment the signal $V_{IN}$ to be frequency spread is mixed with a frequency spread signal $V_S$ output by a local oscillator 201 of the external equipment 110 to generate a frequency spread signal $V_{Spread}$ which is measured by the measurement equipment 100 of any conventional type. In the shown example, the signal $V_{IN}$ is multiplied by the signal $V_S$. The signal $V_S$ is frequency-spread according to sets of determined frequency spreading parameters, e.g. under the control of the user with reference to the electromagnetic emissions as measured and displayed by the equipment 100.

In the shown example, the frequency spreading hardware setup implemented in unit 110 is based on the well-known super-heterodyne conversion stage. It may thus comprise an input 251 for receiving the signal $V_{IN}$ to be frequency spread, which is coupled to a first input of a frequency mixer 211, for instance an analog multiplier or a digital multiplier if the signal $V_{IN}$ is first analog-to-digital converted. The frequency spreading signal $V_S$ may be provided by a frequency spread source 201, e.g. a local oscillator, whose output is coupled to a second input of the multiplier 211. For instance the source 201 may be a variable frequency oscillator providing an analog signal, or digital output values, adapted to be multiplied by multiplier 211 with the signal $V_{IN}$ or with the digital version thereof, respectively. In a variant, the source 201 may be a memory table storing time-voltage pairs (piece-wise linear). The signal $V_S$ is frequency spread according to the above mentioned determined frequency spreading parameters.

As was already presented above with reference to relations (1) to (3), frequency products are obtained at the output of the multiplier 211, which contain the sum and difference of the two multiplied signals. Both of these components are frequency spread with exactly the same parameters as the frequency spread signal $V_S$ provided by source 201. Band pass filtering within the measuring equipment allows one or the other component to be selected before detection. In a variant (not shown) filtering of the unwanted component may be implemented within the frequency spreading unit 110. Examples of implementation as regards the shape of the band pass filter and the detection method can be found in the specifications of the CISPR 16-1-1 standard.

With the embodiment as shown in FIG. 4 and discussed above, the sweeping of the desired frequency range can be achieved by shifting the centre frequency of the frequency spread source 201.

The one with ordinary skills in the art will appreciate that, although the schematic and operation of the unit 110 have been kept simple for the purpose of the present description, more sophisticated implementations may be chosen. In practice, the unit 110 may be adapted to reject image frequencies and other spurious responses. Input filtering, possibly tracked to the local oscillator frequency, may be implemented. In addition, quadrature mixing may be implemented by using an image rejection mixer. The output frequency differs from the input frequency, but several conversions could be used to obtain the same frequency at the output.

The external unit 110 may be designed in analogue, digital or mixed analogue and digital technologies. It can be used by the designers and characterisation engineers.

It will be further appreciated that although sine waves have been considered for mathematical convenience of the calculations as presented in the foregoing, the methods of frequency spreading according to embodiments as described above can be applied to any waveform.

In all of the embodiments as described above, the frequency spread signal can be generated by any classical method. The one with ordinary skills in the art will note that the frequency spreading of the input signal is achieved by adding the signal from frequency spread source 20 or 201 to the input signal $V_{IN}$ which originates from the device under test. Therefore, the fundamental and harmonics are spread by the same peak deviation. This means that each harmonic should in principle be studied independently of the others by applying the desired peak frequency deviation to that harmonic, while ignoring the others. However, this can be overcome by indexing the peak deviation proportionally to the frequency being analyzed. Stated otherwise, a peak deviation of the frequency spreading is made proportional to a frequency of the electrical signal being considered with respect to the EMC test.

Figure 5:
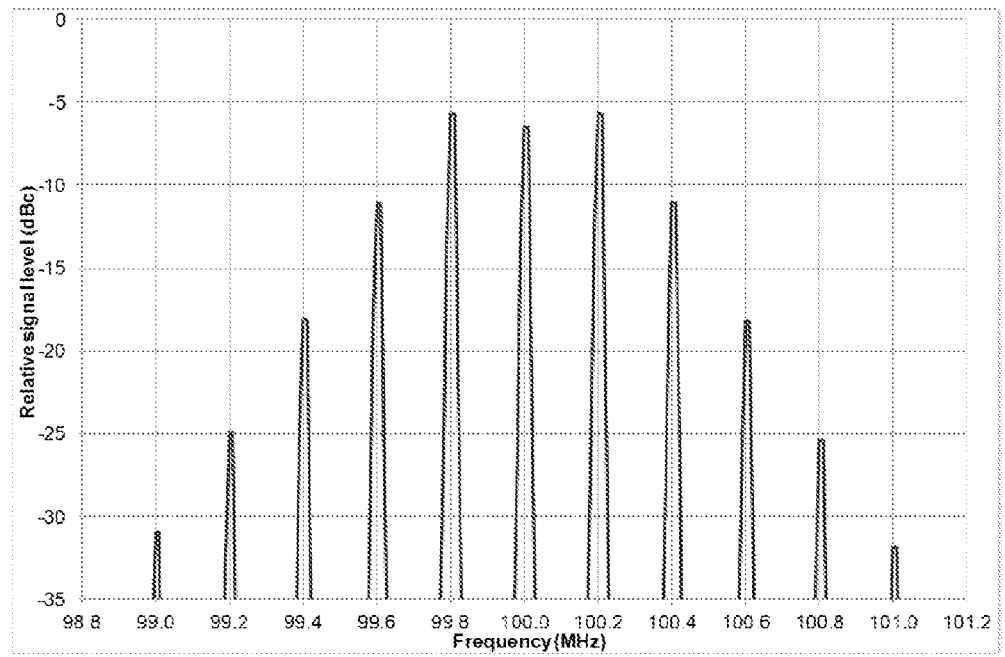
FIG. 5 is a spectrum diagram showing the spectrum of a frequency spread signal having a spectrum spread around 100 MHz, which can be added to the signal being measured by the setup of FIG. 4.
Figure 6:
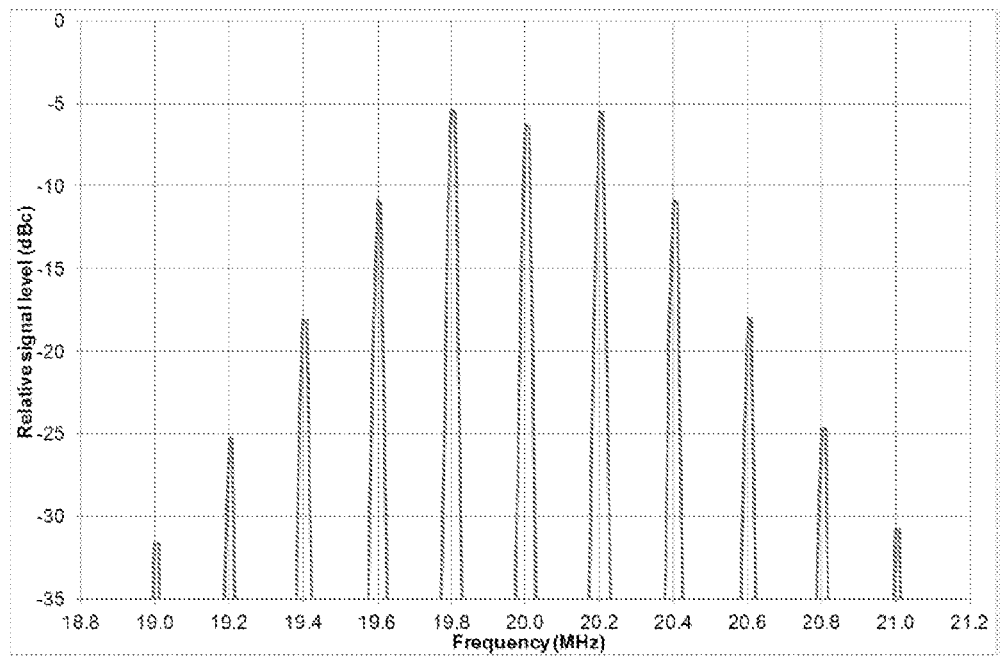
FIG. 6 is a spectrum diagram showing the spectrum of a frequency spread signal output by the setup of FIG. 4, when the signal being measured has a frequency of 120 MHz and is mixed with the frequency spread signal of FIG. 5.

The spectrum diagram of FIG. 6 illustrates the Fast Fourier transform (FFT) of a frequency spread signal which has been obtained using a frequency spreading hardware setup 110. The frequency spread signal was obtained by using the setup of FIG. 4, namely the frequency spreading was achieved by mixing a signal $V_{IN}$ with a frequency spread signal having a FFT as illustrated by the spectrum diagram of FIG. 5.

In the example as illustrated by these spectrum diagrams, the frequency spread signal $V_S$ has a spectrum as shown in FIG. 5 which is spread around 100 MHz. This signal has been added by the unit 110 according to the embodiment of FIG. 4, to a signal which was a sine wave at a frequency of 120 MHz.

FIG. 6 shows the spectrum of the resulting frequency spread signal output by the unit 110. This shows that the output signal has a different frequency (here, the spectrum is centred around 20 MHz, which is the difference between 120 MHz and 100 MHz), but is frequency spread with exactly the same parameters as the frequency spread signal $V_S$.

The design flow for optimizing the design of an electronic device with respect to electromagnetic emissions based on frequency spreading will now be described.

Figure 7:
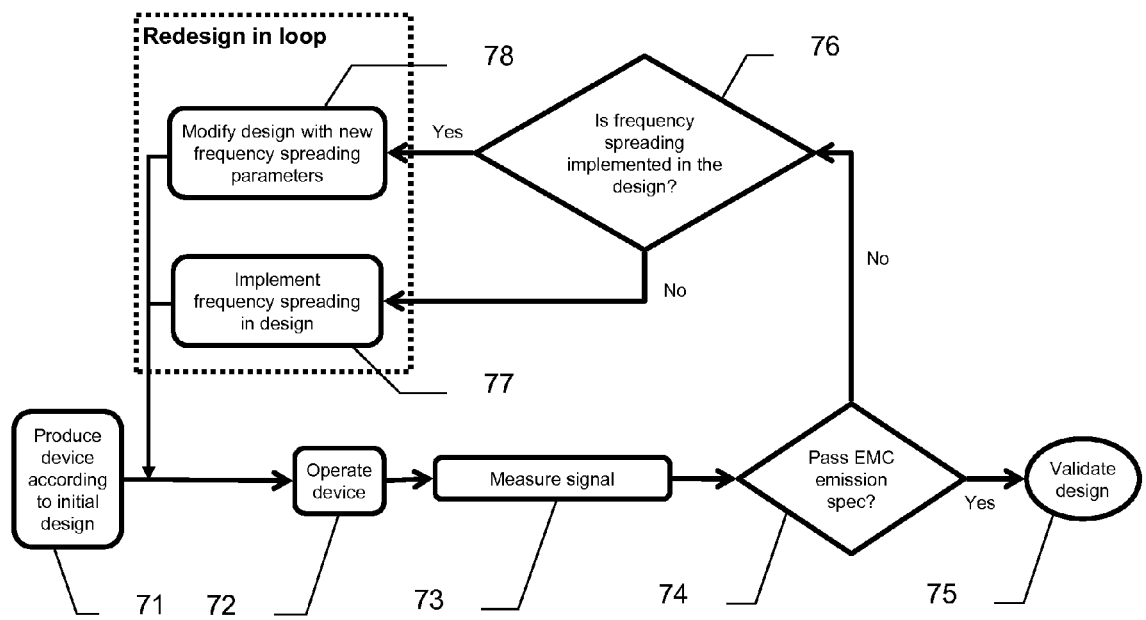
FIG. 7 is a flow diagram illustrating the design flow according to the prior art.

The design flow according to the prior art will first be presented with reference to the flow diagram of FIG. 7.

At 71, the electronic device to be tested is produced according to an initial design of the device, which has been defined by an electronic circuit designer.

At 72, the device under test is operated, so as to let the signal to be measured be emitted at a given test point of the electronic device; e.g. an external pin or terminal.

At 73, the signal is measured by a conventional measurement equipment, and converted to the frequency domain, for instance using a Fast Fourier transform (FFT).

The resulting spectrum is then observed by the user at 74. For example, the level of EM emissions may be displayed to the user through the GUI of the measurement equipment so that the user may visually check whether there is an electromagnetic emission problem or not. For instance, an electromagnetic compatibility (EMC) test may be performed to determine whether the signal being tested does or not cause spurious emissions above a given threshold which would lead to failure to meet the EMC specifications by the actual device.

If not, then the EMC test is passed, and the design of the electronic device is validated, at 75. Else, a redesign of the electronic device is performed, in a looped process.

At 76, if frequency spreading is not implemented in the actual design of the electronic device, then the user will opt, at 77, to implement frequency spreading in the design as frequency spreading should be investigated as a possible solution. Else, namely when frequency spreading is readily implemented in the design, the user will modify the design by choosing new frequency spreading parameters at 78. In both cases, a new device is produced, which implements the design with the added or modified frequency spreading parameters.

Then, the process loops to 72 where another measurement is performed for the new device.

To summarize, having ascertained that the emissions of the device exceed the specified levels at certain frequencies, the designer must choose suitable parameters for the frequency spreading. These parameters include, for instance, the form of the modulating signal (ramp, triangle, stepped or linear, etc), the frequency of the modulating signal and the peak frequency deviation.

The design flow as shown in FIG. 7, however, suffers at least the following drawbacks:
  on-the-fly modifications to the design must be performed to find the optimum frequency spreading parameters, which modifications are time consuming; and,
  a new version of the electronic device must be produced after each design modification.

Figure 8:
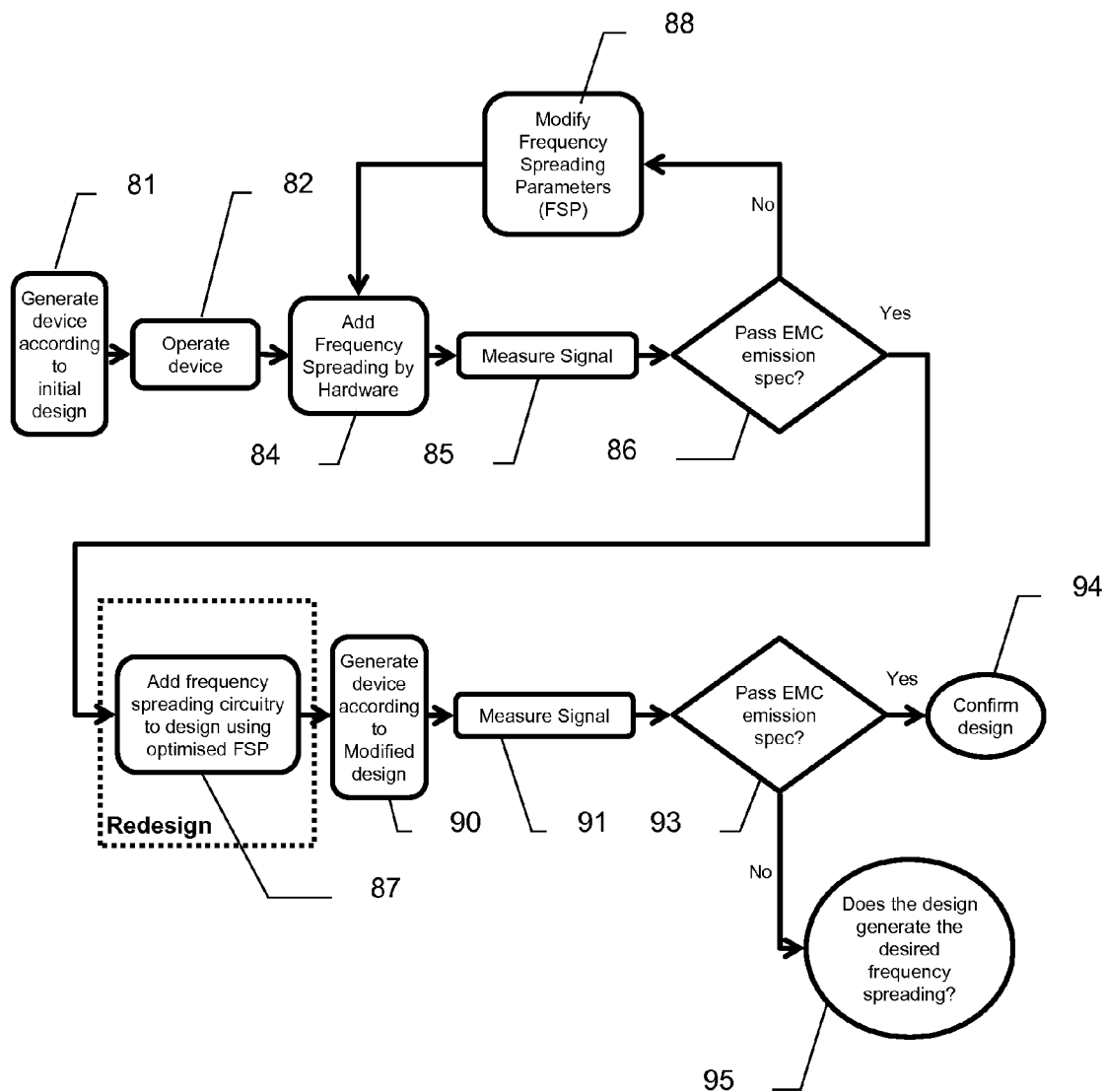
FIG. 8 is a flow diagram illustrating the design flow according to embodiments of the method.

The design flow according to embodiments of the present invention, allowing to alleviate the above inconvenient, will now be presented with reference to the flow diagram of FIG. 8. This design flow may be implemented when it is assumed that no simple design solution can be found to reduce EMC emissions and that frequency spreading should be investigated as a possible solution.

At 81, an electronic device according to an initial design is produced. This is similar to the production of the device performed at 71, in the design flow of FIG. 7 as described above.

At 82, the electronic device is operated to cause the emission of the signal to be measured. This, also, is similar to the operation of the device performed at 72, in the design flow of FIG. 7 as described above.

At 84, frequency spreading is added by hardware to the signal thus emitted, by implementing either one of the embodiments described above with reference to FIG. 2, FIG. 3 and FIG. 4. This comprises applying frequency spreading by mixing, at hardware level, the electrical signal obtained at 82 with a frequency spread signal. In other words, it comprises mixing the electrical signal to be measured with a frequency spread signal. At the first iteration of 84, frequency spreading is applied to the electrical signal according to an initial set of frequency spreading parameters, suitable to reduce electromagnetic emissions of the device.

The peak deviation of the frequency spreading may be made proportional to a frequency of the electrical signal. That way, it is not necessary to study each harmonic independently of the others by applying the desired peak frequency deviation to that harmonic while ignoring the others, even though the fundamental and harmonics are spread by the same peak deviation.

At 85, the frequency-spread signal is measured by the measurement equipment, and converted to the frequency domain, for instance using a Fast Fourier transform (FFT). This, again, is similar to the measurement and conversion performed at 73 in the design flow of FIG. 7 as described above.

The resulting spectrum is then observed at 86. For example, the level of EM emissions may be displayed to the user through the GUI of the measurement equipment, so that the user may visually check whether there is an electromagnetic emission problem or not. In some embodiments a given EMC test is passed when the signal being tested does not cause spurious emissions above a given threshold which would lead to failure to meet the EMC specifications by the actual device.

If the EMC test is passed, then the design of the electronic device is modified at 87 to introduce a frequency spreading feature corresponding to the initial set of frequency spreading parameters.

Else, the steps of applying frequency spreading to the electrical signal, measuring the frequency spread signal (while the device is operated, of course) and checking whether the frequency spread signal passes the EMC test are repeated, at 84, 85 and 86, respectively, with respect to another set of frequency spreading parameters, different from the initial set of frequency spreading parameters. This set of frequency spreading parameters is selected at 88. It will be appreciated, however, that the generation of simulation which had been performed at 81 is not repeated. Stated otherwise, this generation of the actual device is performed only once in the design flow according to embodiments of the proposed solution. This yields in a significant reduction in the time needed and costs to optimize the design of the electronic device with respect to electromagnetic emissions using frequency spreading, compared with the prior art.

In some embodiments, the above steps may be repeated until it is determined, at 86, that the EMC test is passed and the process jumps to the design modification at 87. More precisely, repeating the applying 84 of frequency spreading to the electrical signal, the signal measurement 85 and the checking 86 of whether the frequency spread signal passes the EMC test may be performed iteratively with respect to other, namely respective sets of frequency spreading parameters, until the EMC test is passed or until an end condition for the iterations is met. Such end condition can be met, for example, when a given number of iterations have been run, or when the reduction in the electromagnetic emissions caused by the frequency spread signal remains below a given threshold thus indicating that no significant improvement can be expected if iterations are continued further.

After the design has been modified at 87 to introduce a frequency spreading feature corresponding to the optimum frequency spreading parameters, another device is produced at 90, and measured at 91 (while the device is being operated). However, it will be appreciated that, unlike the device generations at 72 in FIG. 7 which are iteratively repeated, the long and costly redesign and production of a new version of the device are carried out only once.

At 93, and after the measured signal has been converted to the frequency domain, for instance using a Fast Fourier transform (FFT) the resulting spectrum is observed. For example, the level of EM emissions may be displayed to the user through the GUI of the equipment 100, so that the user may visually check whether the EMC test is passed. In practice, the test is passed when the signal being tested does not cause spurious emissions above a given threshold which would lead to failure to meet the EMC specifications by the actual device. This may be determined by the user with consideration of the spectrum of the signal thanks to the GUI or by any other appropriate means.

If the EMC test is passed, then the design of the electronic device is confirmed, at 94. Else, a failure analysis may be performed, at 95, in order to check whether electronic device as redesigned to include the frequency spreading actually generates the expected frequency spreading or not. In cases where there are still EMC problems at that stage, a more in-depth redesign of the electronic device may need to be considered.

Advantages of the solution as described in the above include at least the following:
- no modifications to the design are required to find the optimum frequency spreading parameters, nor is the generation of successive prototypes of the device;
- the design is modified only once, at 87, when the optimum frequency spreading parameters have been determined; and,
- the production of a new version of the device implementing the optimized design (namely with frequency spreading) only needs to be carried out once at 90.

Indeed, designers are able to optimize frequency spreading parameters rapidly and apply them to the design after the first tape-out of the device but still before mass production is launched and the product is released on the market, while avoiding costly redesign after each try of frequency spreading parameters for EMC characterization.

In the foregoing specification, the invention has been described with reference to specific examples of embodiments of the invention. It will, however, be evident that various modifications and changes may be made therein without departing from the broader spirit and scope of the invention as set forth in the appended claims.

Some of the above embodiments, as applicable, may be implemented using a variety of different information processing systems. For example, although FIG. 2; FIG. 3 and FIG. 4 and the discussion thereof describe exemplary frequency spreading architectures, these exemplary architectures are presented merely to provide a useful reference in discussing various aspects of the invention. Of course, the description of the architectures has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device.

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of optimizing a design of an electronic device with respect to electromagnetic emissions based on frequency spreading, the method comprising:
   defining an initial design of the device;
   generating a prototype of the device according to the initial design;
   operating the device to cause emission of an electrical signal at by the device;
   applying frequency spreading to the electrical signal according to an initial set of frequency spreading parameters, suitable to reduce electromagnetic emissions of the device, by mixing said electrical signal with a frequency spread signal at hardware level;
   checking whether the frequency spread electrical signal passes a given electromagnetic compatibility, EMC test;

if the EMC test is passed, then modifying the design to introduce a frequency spreading feature with respect to the set of frequency spreading parameters;

else, repeating applying frequency spreading to the electrical signal and checking whether the frequency spread signal passes the EMC test with respect to another set of frequency spreading parameters, different from the initial set of frequency spreading parameters, and modifying the design to introduce a frequency spreading feature with respect to said other set of frequency spreading parameters if the EMC test is passed, wherein the optimizing the design of the electronic device is used to manufacture the electronic device.

2. The method of claim 1, wherein repeating applying frequency spreading to the electrical signal and checking whether the frequency spread signal passes the EMC test is performed iteratively with respect to other, respective sets of frequency spreading parameters until the EMC test is passed or until an end condition of iterations is met.

3. The method of claim 1, wherein checking whether the frequency spread electrical signal passes the EMC test comprises frequency filtering the frequency spread electrical signal and observing a resulting spectrum of the signal.

4. The method of claim 1, wherein mixing the electrical signal with the frequency spread signal at hardware level comprises the mixing of said electrical signal with said frequency spread signal in a mixer of a measurement equipment.

5. The method of claim 4, wherein the mixer is a Quadrature mixer.

6. The method of claim 1, wherein mixing the electrical signal with a frequency spread signal at simulation level comprises the mixing of said electrical signal with said frequency spread signal in a mixer of a hardware unit external to a measurement equipment.

7. The method of claim 1, wherein a peak deviation of the frequency spreading is proportional to a frequency of the electrical signal being considered with respect to the EMC test.

8. The method of claim 1, wherein the frequency spreading parameters comprise at least one of a form of the frequency spread signal, a frequency of the frequency spread signal, and a peak frequency deviation.

9. An electromagnetic signal measurement equipment comprising:

a frequency spreading insertion block adapted to add frequency spreading by hardware to an electrical signal to be measured originating from an electronic device under test, according to a user-defined set of frequency spreading parameters and to generate a frequency-spread version of the signal to be measured;

a measurement block adapted to measure the frequency spread version of the signal;

a display adapted to display electromagnetic levels of the frequency spread version of the signal to a user; and, an interface adapted to allow the user varying the set of frequency spreading parameters in order to lower the electromagnetic levels under at least one given threshold.

10. The equipment of claim 9, wherein the frequency spreading insertion block comprises a mixer adapted to mix the electrical signal with a frequency spread signal at hardware level.

11. The equipment of claim 10, wherein the mixer is a Quadrature mixer.

12. The equipment of claim 10, wherein the frequency spreading parameters comprise at least one of the form of the frequency spread signal, the frequency of the frequency spread signal and the peak frequency deviation.

13. The equipment of claim 10, wherein a peak deviation of the frequency spreading is proportional to a frequency of interest of the electrical signal.

14. An apparatus adapted to be inserted between an electronic device under test and an electromagnetic signal measurement equipment, and comprising a frequency spreading insertion unit adapted to add frequency spreading by hardware to an electrical signal to be measured originating from an electronic device, according to a user-defined set of frequency spreading parameters and to generate a frequency-spread version of the signal to be measured.

15. The apparatus of claim 14, wherein the frequency spreading insertion unit comprises a mixer adapted to mix the electrical signal with a frequency spread signal at hardware level.

16. The apparatus of claim 14, wherein the frequency spreading parameters comprise at least one of the form of the frequency spread signal, the frequency of the frequency spread signal and the peak frequency deviation.

17. The apparatus of claim 14, wherein a peak deviation of the frequency spreading is proportional to a frequency of interest of the electrical signal.

* * * * *